United States Patent [19]
Wang et al.

[11] Patent Number: 6,075,090
[45] Date of Patent: Jun. 13, 2000

[54] METHOD OF PREPARING A NON-AQUEOUS COMPOSITE WAX PARTICLE DISPERSION

[75] Inventors: Yongcai Wang, Penfield; James L. Bello, Rochester; David E. Decker, Rochester; Dennis E. Smith, Rochester, all of N.Y.

[73] Assignee: Eastman Kodak Company, Rochester, N.Y.

[21] Appl. No.: 09/221,083

[22] Filed: Dec. 28, 1998

[51] Int. Cl.[7] .............................. C08L 91/06; C08L 29/00; C08L 31/00; C08L 33/00; C08L 35/00
[52] U.S. Cl. ...................... 524/763; 524/277; 524/818; 524/827; 524/829; 524/831; 524/832; 524/833; 526/207
[58] Field of Search ..................................... 524/763, 818, 524/827, 829, 831, 832, 833, 277; 526/207

[56] References Cited

U.S. PATENT DOCUMENTS

| | | | |
|---|---|---|---|
| 4,569,896 | 2/1986 | Perez et al. | 430/106.6 |
| 4,608,401 | 8/1986 | Martin | 523/305 |
| 4,766,059 | 8/1988 | Vandenabeele et al. | 430/531 |
| 5,034,454 | 7/1991 | Maska et al. | 524/763 |
| 5,395,877 | 3/1995 | Pucknat et al. | 524/763 |
| 5,434,215 | 7/1995 | Sankaren et al. | 524/832 |
| 5,695,919 | 12/1997 | Wang et al. | 430/527 |

FOREIGN PATENT DOCUMENTS

| | | | |
|---|---|---|---|
| 90562 | 7/1980 | Japan | 524/833 |
| 223810 | 11/1985 | Japan | 524/763 |

*Primary Examiner*—Peter A. Szekely
*Attorney, Agent, or Firm*—Carl F. Ruoff; Doreen M. Wells

[57] ABSTRACT

The present invention is a method of making a stable colloidal non-aqueous wax particle dispersion. The method includes the steps of forming a mixture of a first vinyl monomer of a polymerizable mono-alpha, beta-ethylenically unsaturated compound free of ionic charge groups and capable of addition polymerization and a second vinyl monomer capable of addition polymerization and wax particle in a aqueous medum. The mixture is polymerized using an azo or diazo initiator to form an aqueous dispersion of composite wax particles. The wax particles are redispersed in an organic solvent.

7 Claims, No Drawings

METHOD OF PREPARING A NON-AQUEOUS COMPOSITE WAX PARTICLE DISPERSION

CROSS REFERENCE TO RELATED APPLICATIONS

This application relates to commonly assigned copending application Ser. No. 09/221,639, (Docket 78,853) filed simultaneously herewith. This application relates to commonly assigned copending application Ser. No. 09/221,469, (Docket 78,854), filed simultaneously herewith. This application relates to commonly assigned copending application Ser. No. 09/221,470, (Docket 78,856), filed simultaneously herewith. This application relates to commonly assigned copending application Ser. No. 09/221,465,(Docket 78,857) filed simultaneously herewith. This application relates to commonly assigned copending application Ser. No. 09/221,776,(Docket 78,858), filed simultaneously herewith. This application relates to commonly assigned copending application Ser. No. 09/221,883,(Docket 78,859), filed simultaneously herewith. This application relates to commonly assigned copending application Ser. No. 09/221,516, (Docket 78,865), filed simultaneously herewith. These copending applications are incorporated by reference herein.

FIELD OF THE INVENTION

This invention relates to the preparation of a composite wax particle having improved colloidal stability in an organic solvent medium and more particularly to the preparation of a non-aqueous dispersion composed of composite wax particles having a predominant wax phase and a polymer phase. Even more specifically the invention is directed to the selection of polymerization catalysts for the preparation of certain polymer phase compositions.

BACKGROUND OF THE INVENTION

Waxes have widely been used in a surface coated layer to impart an article with improved barrier properties, anti-blocking properties, rub and mar resistance, controlled releasing properties, slip and lubricity, and water repellency. For example, waxes have been used as a surface finish on candies, chocolate bars, chewing gums and similar products; as an additive in polishes on furniture, leather, floor, automobile and fruits, as pharmaceutical coatings on pills, as a component in creams and lipsticks, as an additive in plastic film emulsions, carbon papers and inks, paints and varnishes, mold releases, metal casting, laminated cartons, water-proof compounds, and the like.

Aqueous wax dispersions of colloidal sizes (0.01 to 5 micron, typically from 0.01 to 1 micron) are generally known. Non-aqueous wax dispersions of colloidal sizes are difficult to prepare. Wax can be compounded into viscous non-aqueous media (viscosity greater than, for example, 1000 cps) by mechanical force. The problem with such an approach is that the particle size is difficult to predict and more difficult to reproduce. The resultant dispersions are not truly colloidal dispersions and on dilution wax particles will settle down or precipitate out.

Waxes are insoluble in most organic solvents, especially in polar organic solvents. Coatings can be made using highly toxic solvents such as propylene dichloride, which is on EPA P/U highly hazardous list.

It is well know in the art to incorporate wax in latex formulations. U.S. Pat. No. 4,569,896 teaches the production of a toner composition that includes resin particles of styrene methacrylate copolymer grafted or containing a low molecular weight wax plus a second resin composed of a terpolymer of styrene, acrylate and acrylonitrile. The developer also contains magnetite particles and carbon black. U.S. Pat. No. 5,034,454 describes the preparation of a crosslinkable water-dispersible acrylic copolymer wherein the polymerization is conducted in an organic solvent in the presence of a wax. The polymerization includes about 1 to 15 weight percent of a wax. U.S. Pat. No. 5,395,877 describes a process for the production of fortified vinyl latex rich in wax copolymerizing in an organic solvent in the presence of a wax under conditions to produce a low molecular weight resin. The copolymer is treated with ammonium hydroxide or aqueous alkali and used as a cosurfactant in a second aqueous emulsion polymerization of vinyl monomers to produce the fortified vinyl latex. U.S. Pat. No. 4,766,059 describes a method of making solid spherical beads having a mean size ranging form 0.5 to about 20 microns. The polymer beads contain a polymeric resinous material and a water insoluble wax. The process of making such solid beads involves the use of water miscible or immiscible low boiling solvent to dissolve both polymeric materials and wax, and subsequently removal of the solvent or solvent mixture by evaporation. This requires large processing equipment and lengthy processing time, which increases the expenses. U.S. Pat. No. 5,695,919 describes a lubricant impregnated core/shell polymer particle, the polymer particle comprising a core portion which is insoluble in the organic medium and a shell portion which has an affinity for both the core portion and the organic medium. It has also disclosed a procedure for preparing the lubricant impregnated particles. However, when the procedure is used to prepare a polymer shell containing a nonionic water soluble vinyl monomer, the resulted particle completely lost its affinity toward any organic solvent medium.

U.S. Pat. No. 4,608,401 describes a method of encapsulating in suspension in an aqueous medium discrete finely divided water-insoluble solid particles with a water-insoluble polymeric envelope comprising the steps of (1) suspending in an aqueous medium, under agitation milder than high shear mixing, (a) finely divided solid particles substantially free of ionic charges of such level that would cause flocculation upon subsequent initiation of addition polymerization and (b) a water-insoluble monomer capable of addition polymerization to form a water-insoluble polymer free of ionically charged groups, in the presence of (c) a water-soluble, non-ionic, surface-active stabilizing agent having a HLB number of at least about 13, the stabilizing agent being present in an amount sufficient to produce a generally stable suspension of the ultimately formed polymer encapsulated particles; (2) introducing an addition polymerization initiating agent which is not an anionic or cationic surface active or dispersing agent, and does not decompose to form same, in an amount sufficient to initiate addition polymerization of the monomer present; and, during or after the introduction of said initiating agent; (3) subjecting the resulting suspension to suspension polymerization conditions, while said suspension is maintained substantially free of anionic or cationic surface active or dispersing agents.

The objective of the present invention is to provide a process for the production of a non-aqueous composite wax particle dispersion which has predominately a wax phase and a polymer phase containing a compound free of ionic charge groups and capable of addition polymerization to form a water soluble homopolymer.

SUMMARY OF THE INVENTION

The present invention is a method of making a stable colloidal non-aqueous wax particle dispersion. The method includes the steps of forming a mixture of a first vinyl monomer of a polymerizable mono-alpha, beta-ethylenically unsaturated compound free of ionic charge groups and capable of addition polymerization and a second vinyl monomer capable of addition polymerization and wax particle in an aqueous medium. The mixture is polymerized using an azo or diazo initiator to form an aqueous dispersion of composite wax particles. The wax particles are redispersed in an organic solvent.

DETAILED DESCRIPTION OF THE INVENTION

A method has been discovered for the preparation of a colloidal stable non-aqueous composite wax particle dispersion. The method involves polymerizing by an emulsion polymerization process a vinyl monomer mixture in the presence of pre-formed aqueous wax particles using an azo or diazo initiator and redispersing the resultant reaction product into an organic solvent medium. The vinyl monomer mixture includes at least two polymerizable mono-alpha, beta-ethylenically unsaturated compounds wherein at least one of the compounds is free of ionic charge groups and capable of addition polymerization to form a water soluble homopolymer and at least one of the compounds is substantially water insoluble and capable of addition polymerization to form a water insoluble homopolymer. The wax is solid at room temperature. The wax to polymer ratio is preferably in the range of from 10:90 to 95:5, and most preferably from 30:70 to 70:30.

The process of the invention has a number of advantages over the methods described in the prior art: (1) It is insensitive to the presence of surface active agents with strong ionic groups and it does not require the process to be substantially nonionic; (2) it is possible to prepare stable, non-aqueous dispersible composite wax particles at high wax to polymer ratios; and (3) It is possible to prepare a composite wax particle with a polymer which contains a substantial amount of nonionic water soluble vinyl monomers without adversely affecting the affinity of the composite wax particle towards organic solvent media.

The composite wax particle prepared by the process of the present invention can be easily transferred from the resulting aqueous dispersion into a non-aqueous medium which is a solvent for the polymer. Alternatively, the composite wax particle may first be isolated from the aqueous dispersion, for example, by spray drying, and then be incorporated into a non-aqueous coating composition.

In a particular embodiment, the invention is directed to an imaging element comprising a support and a layer and is characterized in that the layer contains a composite wax particle prepared by an emulsion polymerization process. The emulsion polymerization process includes polymerizing a vinyl monomer mixture in the presence of pre-formed aqueous wax particles using an oil soluble azo initiator and redispersing the resultant reaction product into an organic solvent medium. The vinyl monomer mixture comprises at least two polymerizable mono-alpha, beta-ethylenically unsaturated compounds wherein at least one of the compounds is free of ionic charge groups and capable of addition polymerization to form a water soluble homopolymer and at least one of the compounds is substantially water insoluble and capable of addition polymerization to form a water insoluble homopolymer. The wax is solid at room temperature. The wax to polymer ratio is preferably in the range of from 10:90 to 95:5, and most preferably from 30:70 to 70:30.

The process of the present invention involves polymerization in the presence of pre-formed aqueous wax particles. The wax is a solid at room temperature. Wax useful for the practice of the invention has been described, for example, in references such as "The Chemistry and Technology of Waxes", A. H. Warth, $_2$nd Ed., Reinhold Publishing Corporation, New York, N.Y. 1956, and "Plastics Additives and Modifiers Handbook", Chapter 54–59, J. Ederibaum (Ed.), Van Nostrand Reinhold, New York, N.Y. 1992. Suitable waxes include hydrocarbon and/or ester-containing waxes, e.g. animal waxes such as beewax, plant waxes such as carnauba wax, paraffin waxes, microcrystalline waxes, Fischer-Torpsch waxes, polyethylene waxes, polypropylene waxes, and a mixture thereof.

Pre-formed aqueous wax dispersions (or emulsions) are primarily composed of wax particles, dispersants/surfactants, and water. The dispersants can be nonionic, anionic, and cationic, and can be polymeric and are used at levels as high as 20% of the wax. Wax particles can be formed by various methods known in the art. For example, they can be prepared by pulverizing and classifying dry waxes or by spray drying of a solution containing waxes followed by redipsersing the resultant particles in water using a dispersant. They can be prepared by a suspension technique which includes dissolving a wax in, for example, a water immiscible solvent, dispersing the solution as fine liquid droplets in an aqueous solution, and removing the solvent by evaporation or other suitable techniques. They can be prepared by mechanically grinding a wax material in water to a desired particle size in the presence a dispersant, heating the wax particles dispersed in water to a temperature greater than their melting point, and cooling the melted particles in water to form a stable wax emulsion.

In the present invention, the pre-formed aqueous wax dispersions are preferably formed by the so-called "atmospheric emulsification" and "pressure emulsification" techniques. The atmospheric emulsification process is used to prepare wax dispersions for waxes with melting points below the boiling point of water. The process typically includes melting wax and surfactant together, and optionally adding a base to the melt. Hot water is then slowly added to the wax melt at vigorous agitation (water to wax). Wax emulsion can also be formed by adding molten wax/surfactant blend to boiling water at vigorous agitation. Pressure emulsification is generally needed for wax with a melting point greater than 100° C. It is similar to the process described above except at temperatures above the water boiling point. Vessels capable of withstanding high pressures are normally used.

The vinyl monomer mixture useful for the present invention comprises at least two polymerizable mono-alpha, beta-ethylenically unsaturated compounds wherein at least one of the compounds (Vinyl Monomer I) is free of ionic charge groups and capable of addition polymerization to form a water soluble homopolymer and at least one of the compounds (Vinyl Monomer II) is substantially water insoluble and capable of addition polymerization to form a water insoluble homopolymer. Ethylenically unsaturated monomers which can be used as the Vinyl Monomer I may include, for example, (meth)acrylamides such as acrylamide, methacrylamide, N,N-dimethyl acrylamide, N-methylol acrylamide, and isopropyl acrylamide, poly (ethylene glycol)(meth)acrylates, N-vinyl-2-pyrrolidone, hydroxyl ethyl methacrylate, hydroxyl ethyl acrylate, vinyl methyl ether, and the like. Ethylenically unsaturated monomers which can be used as the second vinyl monomer include virtually all monomers capable of undergoing addition polymerization in emulsion polymerization to produce polymers free of ionic charge groups and essentially water-insoluble. Typical useful monomers thus include, for example, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate acrylonitrile, methacrylonitrile, vinyl acetate, vinyl propionate, vinylidene chloride, vinyl chloride, styrene, t-butyl styrene, vinyl toluene, butadiene, isoprene, and the like.

The polymerization reaction involved in the present invention is initiated and maintained with an initiating agent or catalyst, which is very similar to those used in conventional emulsion polymerization except that the initiators any of the usual peroxides and hydroperoxides are not acceptable for use here. It appears that the composite wax particles prepared with peroxide initiators cannot be redispersed in non-aqueous media. Most useful catalysts for the practice of the present invention are azo and diazo compounds, for example, 2,2'-azobisisobutyronitrile, 2,2'-azobis (2,4-dimethyl valeronitrile), 2,2'-azobis (2,3-dimethyl butyronitrile), 2,2'-azobis (2-methyl butyronitrile), 2,2'-azobis (2,3,3-trimethyl butyronitrile), 2,2'-azobis (2-isopropyl butyronitrile), 1,1'-azobis (cyclohexane-1-carbonitrile), 2,2'-azobis (4-methoxy-2,4-dimethyl valeronitrile), 2-(carbamoylazo) isobutyronitrile, 4,4'-azobis (4-cyanovaleric acid), and dimethyl-2,2'-azobis isobutyrate. The amount of the initiators employed follows generally the practice in a conventional emulsion polymerization. In general, the amounts can vary within the range of about 0.2 to 3 or 4 weight percent or possibly higher by weight of the total monomers. It is generally recognized that a high level of initiators tends to result in lowered molecular weights for the ultimate polymers. If the polymerization is carried out in multiple stages, the amount of initiators in the beginning or initiating stage are adjusted to match the proportion of the monomer then present, and further initiators are fed during the delayed feed stage to correspond to the delayed feed of the monomers. Basically, in any case, the initiators are supplied as needed to maintain the reaction in smooth and easily controlled conditions. Surfactants that can be used in the present invention include, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition". Chain transfer agents may also be used to control the properties of the polymer particles formed.

Generally speaking, the reaction conditions employed in the execution of the present method parallel those utilized in conventional emulsion polymerization as regards such variables as temperature, time, agitation, equipment, etc. The reaction temperature can be maintained at a constant value or can vary from 50 to 80 or 90° C. If the reaction temperature varies, the starting temperature is usually around 50 to 55° C., and as the reaction proceeds exothermically, the temperature rises.

The time of the reaction is difficult to predict since it will depend upon other variables, such as the amount of initiating agent introduced, the reaction temperature, etc. If the amount of monomer is small, the reaction may be finished within about an hour but with larger amounts the reaction will usually continue for 3 to 4 hours. About ½ to 1 hour of post-heating stage after all monomer has been added can be used to insure that the polymerization has gone to completion and no free monomer is present. The sequence of addition of the various ingredients is not critical and can be varied. Usually, aqueous medium is first added to the reactor, then aqueous wax dispersion, and monomer in that order, all being added while the medium is thoroughly agitated, followed by the initiators, but other sequences are possible.

In one of the preferred embodiments of the invention, the involved polymerization process in the presence of preformed aqueous wax particles is carried out sequentially (see, for example, Padget, J. C. in Journal of Coating Technology, Vol 66, No. 839, pages 89 to 105, 1994). In this process, the polymerization is conducted in a monomer-starved manner.

The copolymer contained in the composite wax particles of the invention is properly designed to have good "bonding" with the wax phase and good compatibility in a solvent medium. Defining compatibility of the copolymer in the solvent medium can be achieved by using the concept of "polymer solubility map" (see, for example, Ramsbothan, J. in Progress in Organic Coatings, Vol 8, pages 113–141, 1980; and Wicks, Jr. Z. W., Jones, F. N., and Papas, S. P. in Organic Coatings, pages 229–239, 1992, John Wiley & Sons, Inc.). As the organic Solvents, any of the solvents customarily used in coating compositions may be satisfactorily used.

If the polymer contained in the composite wax particle of the invention must be soluble in a non-aqueous medium it is necessary that the polymer be firmly bound either physically or chemically to the wax phase. Otherwise the polymer may be dissolved away from the wax phase and the composite wax particle would lose its stability. Chemical bonding can be achieved by grafting of the polymer to the wax phase. One of the mechanisms may involve abstraction of hydrogen from the wax molecule by free radical present in the system, giving active centers onto which the polymer chain may grow.

The composite wax particle prepared by the process of the present invention can be easily transferred from the resulting aqueous dispersion into a non-aqueous medium which is a solvent for the polymer. Alternatively, the composite wax particle may first be isolated from the aqueous dispersion, for example, by spray drying, and then be incorporated into a non-aqueous coating composition.

The imaging elements of this invention can be of many different types depending on the particular use for which they are intended. Details with respect to the composition and function of a wide variety of different imaging elements are provided in U.S. Pat. No. 5,300,676 and references described therein. Such elements include, for example, photographic, electrophotographic, electrostatographic, photothermographic, migration, electrothermographic, dielectric recording and thermal-dye-transfer imaging elements. Layers of imaging elements other than the image-forming layer are commonly referred to auxiliary layers. There are many different types of auxiliary layers such as, for example, subbing layers, backing layers, interlayers, overcoat layers, receiving layers, stripping layers, antistatic layers, transparent magnetic layers, and the like.

Support materials for an imaging element often employ auxiliary layers comprising glassy, hydrophobic polymers such as polyacrylates, polymethacrylates, polystyrenes, or cellulose esters, for example. One typical application for such an auxiliary layer is as a backing layer to provide resistance to abrasion, scratching, blocking, and ferrotyping. Such backing layers may be applied directly onto the support material, applied onto a priming or "subbing" layer, or applied as an overcoat for an underlying layer such as an antistatic layer, transparent magnetic layer, or the like. For example, U.S. Pat. No. 4,203,769 describes a vanadium pentoxide-containing antistatic layer that is overcoated with a cellulosic layer applied from an organic solvent. U.S. Pat. Nos. 4,612,279 and 4,735,976 describe organic solvent-applied layers comprising a blend of cellulose nitrate and a copolymer containing acrylic acid or methacrylic acid that serve as overcoats for antistatic layers.

In a particularly preferred embodiment, the imaging elements of this invention are photographic elements, such as photographic films, photographic papers or photographic glass plates, in which the image-forming layer is a radiation-sensitive silver halide emulsion layer. The thickness of the support is not critical. Support thickness of 2 to 10 mil (0.06 to 0.30 millimeters) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer. The emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The following examples are used to illustrate the present invention. However, it should be understood that the invention is not limited to these illustrative examples.

EXAMPLES

Example 1 (Invention)

A stirred reactor containing 438.3 g of Michemlube 160 (25% solids, from Michelman, Inc.) was heated to 85° C. and purged with $N_2$ for 2 hour. 0.365 g of azobisisobutyronitrile in 10 g of toluene was then added to the reactor. An emulsion containing 109.6 g of deionized water, 32.9 g of 10% by weight Triton X100 surfactant, 9.1 g of a 10% by weight sodium dodecyl sulfonate surfactant, 87.7 g of methyl methacrylate, 21.9 g of vinyl pyrrolidone, and 0.18 g of azobisisobutyronitrile was added continuously for 2 hours. The reaction was allowed to continue for 4 more hours before the reactor was cooled down to room temperature. The composite wax particle dispersion prepared was filtered through glass fiber to remove any coagulum.

The resultant composite wax particle dispersion has a solid of about 31%. The particle contains about more than 40% by weight of carnauba wax, about 50% by weight of poly(methyl methacrylate-co-vinyl pyrrolidone) (MMA/VP 80/20) with the balance being the amount of stabilizers/dispersants used. The composite wax particle is designated as Wax-1.

Composite wax particles Wax-2 to Wax-7 were prepared in a similar manner. Their compositions and other parameters are listed in Table 1.

TABLE 1

| Example | Wax Particle | Copolymer Composition |
| --- | --- | --- |
| Example 1 Wax-1 | ML160 (130 nm) From Michelman, Inc. | Poly(methyl methacrylate-co-vinyl pyrrolidone) 80/20 |
| Example 2 Wax-2 | ML160 (130 nm) From Michelman, Inc | Poly(methyl methacrylate-co-vinyl pyrrolidone) 60/40 |
| Example 3 Wax-3 | ML160 (130 nm) From Michelman, Inc | Poly(methyl methacrylate-co-vinyl pyrrolidone) 90/10 |
| Example 4 Wax-4 | ML160 (130 nm) From Michelman, Inc | Poly(methyl methacrylate-co-vinyl pyrrolidone) 95/5 |
| Example 5 Wax-5 | ML160 (130 nm) From Michelman, Inc | Poly(methyl methacrylate-co-hydroxyethyl methacrylate) 97.5/12.5 |
| Example 6 Wax-6 | ML160 (130 nm) From Michelman, Inc | Poly(methyl methacrylate-co-N,N-dimethyl acrylamide) 90/10 |
| Example 7 Wax-7 | ML160 (130 nm) From Michelman, Inc | Poly(methyl methacrylate-co-poly(ethylene glycol)methacrylate $M_n$ = 360)95/15 |

Example 8 (Comparative)

A stirred reactor containing 438.3 g of Michemlube 160 (25% solids, from Michelman, Inc.) was heated to 85° C. and purged with $N_2$ for 2 hour. 0.365 g of Benzoyl peroxide in 10 g of toluene was then added to the reactor. An emulsion containing 109.6 g of deionized water, 32.9 g of 10% by weight Triton X100 surfactant, 9.1 g of a 10% by weight sodium dodecyl sulfonate surfactant, 87.7 g of methyl methacrylate, 21.9 g of vinyl pyrrolidone, and 0.18 g of benzoyl peroxide was added continuously for 2 hours. The reaction was allowed to continue for 4 more hours before the reactor was cooled down to room temperature. The composite wax particle dispersion prepared was filtered through glass fiber to remove any coagulum.

The composite wax particles prepared above were tested for their dispersability in some common solvents. The dispersions were made at room temperature at 0.8% solids (by weight). The quality of the dispersions and their stability were assessed by visual appearance. The composite wax particles prepared by the process of the invention are readily dispersible in a range of solvents with very good storage stability. On the other hand, the composite wax particle prepared in the Comparative Example 8 is not dispersible. The only difference in the Comparative Example 8 and Inventive Example 1 is the catalyst used. The polymerization initiator used in the Comparative Example 8 is benzoyl peroxide, and that used in the Inventive Example is azobizisobutyronitrile.

Example 9 (Comparative)

A stirred reactor containing 438.3 g of Michemlube 160 (25% solids, from Michelman, Inc.) was heated to 85° C. and purged with $N_2$ for 2 hour. 0.365 g of Benzoyl peroxide in 10 g of toluene was then added to the reactor. An emulsion containing 109.6 g of deionized water, 32.9 g of 10% by weight Triton X100 surfactant, 9.1 g of a 10% by weight sodium dodecyl sulfonate surfactant, 93.2 g of methyl methacrylate, 16.4 g of methacrylic acid, and 0.18 g of benzoyl peroxide was added continuously for 2 hours. The reaction was allowed to continue for 4 more hours before the reactor was cooled down to room temperature. The composite wax particle dispersion prepared was filtered through glass fiber to remove any coagulum.

The composite wax particle prepared in the Comparative Example 9 is readily dispersible in a range of organic solvent. The difference in the Comparative Example 8 and 9 is the vinyl comonomers used. In the Comparative Example 8, the vinyl comonomer is a vinyl pyrrolidone. The monomer does not carry an ionizable group. On the other hand, the vinyl comonomer used in the Comparative Example 9 is methacrylic acid, which carries an ionizable group.

The invention has been described in detail with particular reference to certain preferred embodiments thereof, but it will be understood that variations and modifications can be effected within the spirit and scope of the invention.

What is claimed is:

1. A method of making a stable colloidal non-aqueous wax particle dispersion comprising;

forming a mixture of a first vinyl monomer comprising a polymerizable mono-alpha, beta-ethylenically unsaturated compound free of ionic charge groups and capable of addition polymerization to form a water soluble homopolymer and a second vinyl monomer capable of addition polymerization to form a substantially water insoluble homopolymer and wax particle in an aqueous medium;

polymerizing the mixture using an azo or diazo initiator to form an aqueous dispersion of composite wax particles; and redispersing the wax particles in an organic solvent.

2. The method of claim 1 wherein the wax particles comprise animal waxes, plant waxes, paraffin waxes, microcrystalline waxes, Fischer-Torpsch waxes, polyethylene waxes or polypropylene waxes.

3. The method of claim 1 wherein the aqueous medium further comprises a dispersant.

4. The method of claim 1 wherein the first vinyl monomer comprises (meth)acrylamides, poly(ethylene glycol)(meth) acrylates, N-vinyl-2-pyrrolidone, hydroxyl ethyl methacrylate, hydroxyl ethyl acrylate or vinyl methyl ether.

5. The method of claim 1 wherein the second vinyl monomer comprises methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate acrylonitrile, methacrylonitrile, vinyl acetate, vinyl propionate, vinylidene chloride, vinyl chloride, styrene, t-butyl styrene, vinyl toluene, butadiene or isoprene.

6. The method of claim 1 wherein the azo initiator comprises 2,2'-azobisisobutyronitrile, 2,2'-azobis (2,4-dimethyl valeronitrile), 2,2'-azobis (2,3-dimethyl butyronitrile), 2,2'-azobis (2-methyl butyronitrile), 2,2'-azobis (2,3,3-trimethyl butyronitrile), 2,2'-azobis (2-isopropyl butyronitrile), 1,1'-azobis (cyclohexane-1-carbonitrile), 2,2'-azobis (4-methoxy-2,4-dimethyl valeronitrile), 2-(carbamoylazo) isobutyronitrile, 4,4'-azobis (4-cyanovaleric acid), dimethyl-2,2'-azobis isobutyrate.

7. The method of claim 1 wherein the azo or diazo initiator comprises from 0.2 to 4 weight % of the first and second monomers.

* * * * *